*G. H. Blakesley,*

*Clock Socket.*

*No. 101,815.* *Patented Apr. 12. 1870.*

Witnesses.
C. A. Shepard
Nettie Shepard.

Inventor.
Gilbert H. Blakesley
By James Shepard Atty.

United States Patent Office.

GILBERT H. BLAKESLEY, OF BRISTOL, CONNECTICUT.

Letters Patent No. 101,815, dated April 12, 1870.

IMPROVEMENT IN TUBULAR SHAFTS FOR CLOCKS.

The Schedule referred to in these Letters Patent and making part of the same

I, GILBERT H. BLAKESLEY, of Bristol, in the county of Hartford and State of Connecticut, have invented a new and useful Improvement in Clock-Sockets, of which the following is a specification.

My invention relates to the mode of constructing the socket or hollow shaft which carries the short hand in clocks, and is designed to produce the same at a less cost than has hitherto been done. It may also be applied to the construction of the socket which carries the alarm-dial.

My invention consists in the employment of solid drawn tubing for the main portion of the socket, and of attaching a collet or other posts thereto, all as hereafter more fully described.

In the accompanying drawings—

Figure 1:
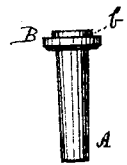
Figure 2:
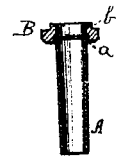
Figure 3:
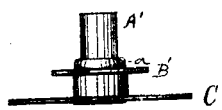

Figure 1 is a side elevation of my invention;
Figure 2 is a longitudinal section of the same;
Figure 3 is a side elevation of an alarm-socket; and
Figure 4 a longitudinal section of the same.

To construct these sockets, I first procure or make what is generally termed "solid drawn tubing," which is drawn from a single, round, flat piece of sheet-metal in the usual manner. It should be made slightly tapering, and of the desired taper for the outside of the finished socket.

This tubing is placed on a revolving arbor provided with a small bead, and by the aid of a knerl or small grooved roller, placed with its groove opposite the bead on the arbor, a bead is swaged on one end of the tube which is to form the socket A. The ragged end of the tube is cut off at a proper distance from the bead in any proper manner.

A small collet with a hole drilled or punched in its center, of a proper size to fit the tube at its large end, said hole being slightly countersunk on the upper side of the collet, and swept out on the under side to admit the bead, is placed upon said tube.

By a suitable tool the open end of the tube is turned or swaged outward and over onto the countersink in the upper side of the collet, as shown in the section, fig. 2, which sufficiently secures the same to the tube. It is then placed in a lathe having a line center, which fills the collet end of the tube snugly enough to cause the same to revolve with said center.

The small end of the tube, which is still solid, revolves in a female center.

A wheel-tenon, $b$, is turned on the collet, which is otherwise turned true and round, forming the finished collet B, shown in the drawings.

The outside of the tube or socket A is burnished or brightened, and its solid end cut off, after which the bur, made by cutting off, is removed, when the socket is ready for use.

The socket has a bearing on its outside in the front plate of the clock, at a point near the bead $a$, while the center shaft, for carrying the long pointer, fills its inside at the small end, which will sufficiently support the socket A in place, although the cavity through it is tapering.

Figure 4:
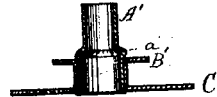

For alarm-sockets, the tubing is drawn with its sides straight, and of two different diameters, as shown in fig. 4.

The socket A' is formed with the bead $a$, in manner before described for clock-sockets, while the usual cam, B', (which may also be made of solid drawn tubing;) is placed on the socket A', and resting on the bead $a$.

The alarm dial C is then placed on the end of the socket A', and resting on the end of the body of the cam B', when the end of the socket A' is swaged over onto the dial C, thus securing the whole in place.

The tube can be burnished and its solid end cut off, and, if desired, can be slit, to adapt it to fit different clocks, when the same is ready for use.

Ordinary clock and alarm-sockets are made of cast-brass, with a rim cast on the large end for the wheel-tenon or the cam. A straight hole is drilled through it lengthwise, after which it is turned into the required form. As it is difficult to drill these castings exactly in the center, considerable surplus stock must be allowed for turning off. The drilling and turning chips from one casting often weigh four or five times as much as the finished sockets.

By my invention the finished socket can be produced at about the price of the bore casting for the ordinary style.

I claim as my invention—

A clock or alarm-socket, consisting of the solid drawn tube or socket A and the collet B, substantially as described.

G. H. BLAKESLEY.

Witnesses:
AUGUSTINE NORTON,
H. H. WARNER.